US012703574B2

(12) United States Patent
Kondo et al.

(10) Patent No.: US 12,703,574 B2
(45) Date of Patent: Aug. 11, 2026

(54) ARTICLE SUPPLY DEVICE

(71) Applicant: BANDAI CO., LTD., Tokyo (JP)

(72) Inventors: Hajime Kondo, Tokyo (JP); Tatsushi Ikarashi, Tokyo (JP); Hiroki Kobayashi, Tokyo (JP); Nobuo Kurokawa, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 261 days.

(21) Appl. No.: 18/542,714

(22) Filed: Dec. 17, 2023

(65) Prior Publication Data

US 2024/0208738 A1 Jun. 27, 2024

(30) Foreign Application Priority Data

Dec. 23, 2022 (JP) ................................ 2022-206681

(51) Int. Cl.

*B65G 43/08* (2006.01)
*B65G 65/36* (2006.01)
*B65G 65/38* (2006.01)
*B65B 35/12* (2006.01)

(52) U.S. Cl.

CPC ........... *B65G 43/08* (2013.01); *B65G 65/365* (2013.01); *B65G 65/38* (2013.01); *B65B 35/12* (2013.01); *B65G 2814/0323* (2013.01)

(58) Field of Classification Search

CPC ........ B65B 35/12; B65G 43/08; B65G 65/38; B65G 65/365; B65G 2814/0323; G07F 11/00

See application file for complete search history.

(56) References Cited

U.S. PATENT DOCUMENTS 3,270,916 A * 9/1966 Lyman ...................... G07F 9/02 221/6
2022/0237553 A1 7/2022 Kondo et al.

FOREIGN PATENT DOCUMENTS

| | | | |
|---|---|---|---|
| CN | 103106740 | A | 5/2013 |
| CN | 110660160 | A | 1/2020 |
| CN | 114026619 | A | 2/2022 |
| JP | S62-78998 | U | 5/1987 |
| JP | 2003187319 | A * | 7/2003 |
| JP | 2008-19045 | A | 1/2008 |

(Continued)

OTHER PUBLICATIONS

WIPO, International Search Report for International Application No. PCT/JP2023/041917, Jan. 16, 2024.

(Continued)

*Primary Examiner* — Gene O Crawford
*Assistant Examiner* — Kelvin L Randall, Jr.
(74) *Attorney, Agent, or Firm* — Imaizumi IP Law, PLLC; Toshikatsu Imaizumi

(57) ABSTRACT

An article supply device capable of supplying first and second type articles comprises a main body, an accommodation unit for accommodating articles, a supply unit for supplying articles accommodated in the accommodation unit, a lock unit which prevents articles from being supplied from the supply unit; and a detection unit capable of detecting the presence or absence of first type articles and the presence or absence of the second type articles accommodated in the accommodation unit, wherein the lock unit is turned into a lock state, on condition that the absence of the articles is detected by the detection unit.

14 Claims, 16 Drawing Sheets

(56) References Cited

FOREIGN PATENT DOCUMENTS

| | | | | | |
|---|---|---|---|---|---|
| JP | 2008019045 | A | * | 1/2008 | |
| JP | 2013149067 | A | * | 8/2013 | .............. G07F 11/44 |
| JP | 2021-15524 | A | | 2/2021 | |
| JP | 2021015524 | A | * | 2/2021 | ........... G06Q 10/087 |
| JP | 2021-39400 | A | | 3/2021 | |

OTHER PUBLICATIONS

WIPO, Written Opinion for International Application No. PCT/JP2023/041917, Jan. 16, 2024.
Japan Patent Office(JPO), Office Action for Patent Application No. 2022-206681, Jul. 16, 2023.
The State Intellectual Property Office of People's Republic of China, Office Action, Chinese Patent Application No. 202311509308.04, Sep. 12, 2025.

* cited by examiner 1
10
SP1
P1
31a
32
P1
2
10f
31
31g
30
10u
50
10b
4e
41b (40b)
41a (40a)
2d
10d
10dh
9a
4d
4a
4c
4
4b
3b
2r
2f
9

1
20
20j
20e
20h
20r
P2
2
SP2
2r
20k
20f
20i
35
20m
61
20b
20n
29
20t
21
4e
20d
41b (40b)
2d
4d
41a (40a)
9a
4a
4c
4
4b
3b
2f
9

ARTICLE SUPPLY DEVICE

CROSS-REFERENCE TO RELATED APPLICATIONS

The disclosure of Japanese Patent Application No. 2022-206681 filed on Dec. 23, 2022 including specification, drawings and claims is incorporated herein by reference in its entirety.

TECHNICAL FIELD

The present invention relates to an article supply device.

BACKGROUND

For example, Patent Document 1 discloses a toy capable of supplying an article. The toy is configured so that one of spherical articles accommodated in a supply box may be taken out from a take-out port located at a lower part of a main body thereof by performing a rotation operation of an operation unit provided on a near side of the main body.

PRIOR ART

Patent Documents

[Patent Document 1] Japanese Utility Patent Application Publication No. S62-78998

SUMMARY

Technical Problem

The toy disclosed in Patent Document 1, which may be referred to as an article supply device, supplies spherical articles, but cannot supply any other articles than such spherical articles. That is, in this type of the article supply methods, a dedicated article supply device for articles having a certain external shape is required. When articles having a different shape therefrom need to be supplied, another article supply device which is adjusted for the different shape articles is required.

It is an object of the present invention is to provide an article supply device capable of dealing with various types of articles.

Solution to Problem

One of the aspects of the present invention is an article supply device capable of supplying first type articles and second type articles. The article supply device comprises a main body, an accommodation unit for accommodating the articles, a supply unit for supplying the articles accommodated in the accommodation unit, a lock unit which makes it impossible to supply the articles from the supply unit; and a detection unit capable of detecting the presence or absence of first type articles in the accommodation unit and the presence or absence of the second type articles in the accommodation unit, wherein the lock unit is turned into a lock state, on condition that the absence of the articles is detected by the detection unit.

Advantageous Effect of Invention

According to the present invention, it is possible to provide an article supply device capable of dealing with various types of articles.

DETAILED DESCRIPTION

An article supply device according to an embodiment of the present invention will be described, referring to drawings. Regarding the orientation (directions) in the explanation set forth below, a front face side of the article supply device is set as a front when the article supply device is viewed from the front face side so that front and back directions thereof (front side or back side), left and right directions thereof (right side or left side) and up and down directions thereof (upper side or lower side) are shown based thereon. Each of these directions is shown by using an arrow in the figures.

Figure 1:
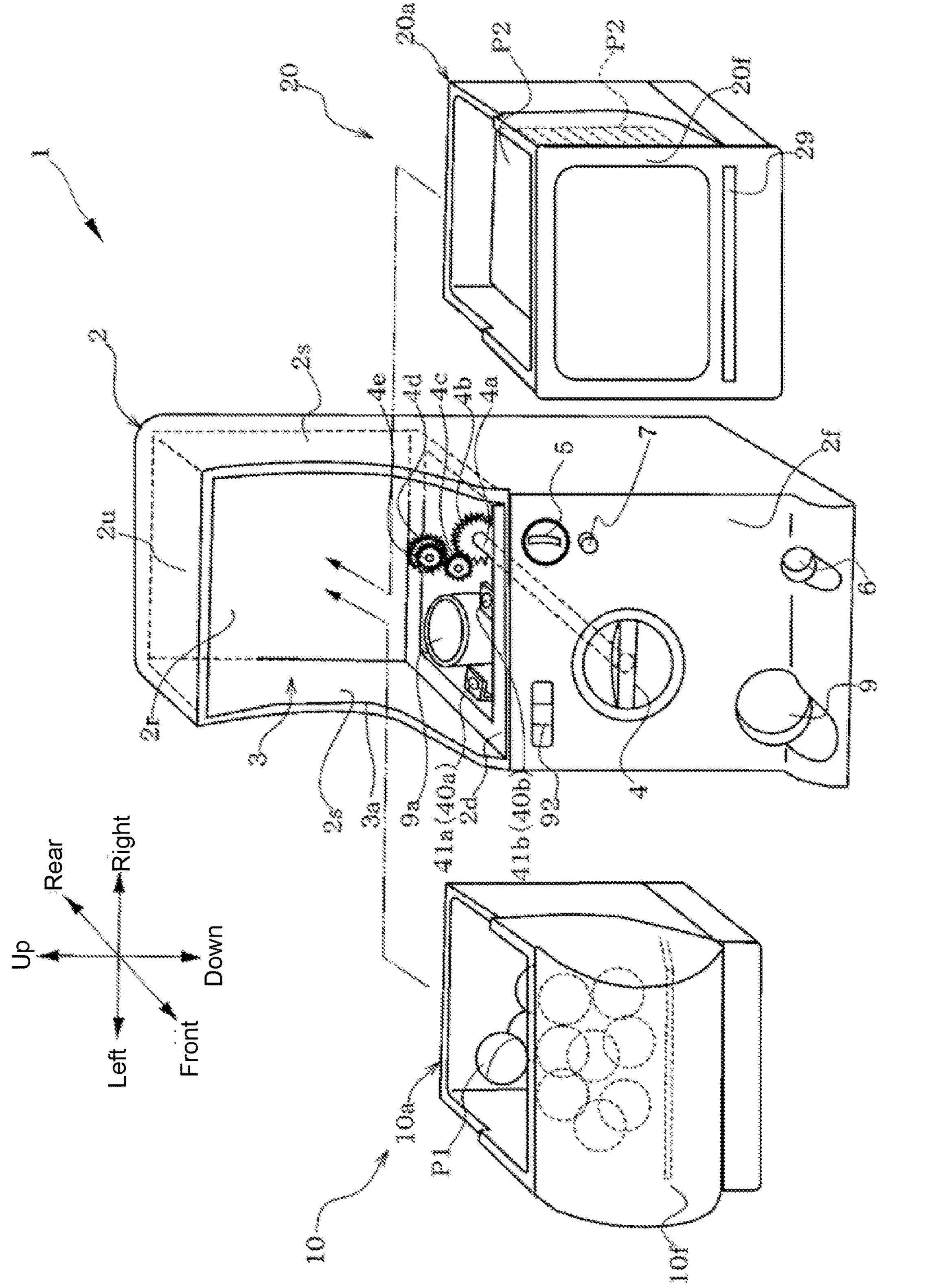
FIG. 1 is a schematic perspective view of an article supply device according to an embodiment of the present invention, wherein an accommodation unit for the first type articles and an accommodation unit for second type articles are detached from a main body thereof.

FIG. 1 is a schematic perspective view of an article supply device, for illustrating a state where a first type article accommodation unit 10 (hereinafter referred to as a first accommodation section 10) and a second type article accommodation unit 20 (hereinafter referred to as a second accommodation section 20) are detached from a main body 2 of the article supply device 1. The article supply device 1 can supply (dispense) a first kind of article, for example, a first type article P1, for example, in a spherical capsule-shape, by paying a price. Furthermore, the article supply device 1 can supply (dispense) a second kind of article, which is a second type article P2, which is thin and flat. In other words, the article supply device 1 can supply multiple types of articles (products).

Here, the term "a first type article P1 in a capsule-shape" refers to, for example, one (or more) of various products, contained in a synthetic resin-made and capsule-shaped case, or a spherical-shaped articles. On the other hand, the second type article P2 includes a relatively thin flat object such as a sheet-like printed material, a card, thin case, etc., and is an object that can be accommodated in a stacked manner.

As shown in FIG. 1, the article supply device 1 comprises a main body 2 formed by a box-shaped structure having a front wall 2*f*, left and right side walls 2*s*, a rear wall 2*r*, a top wall 2*u*, and a bottom wall (not shown). Various operational components are provided on the front wall 2*f*. For example, a coin insertion section 5 for accepting payment for a first type article P1, a first supply port 9 from which the firs type article P1 is supplied, an operation unit 4 for allowing a supply of the first type article P1 from the first supply port 9 by a rotation operation, a return port 6 for returning cash as needed, a cash return button 7, a second notification unit 92 capable of emitting light, which will be explained later, are provided on the front face wall 2*f*. Additionally, on an upper side of the front wall 2*f*, an attachment section 3 is provided with a large opening on a front face side thereof and a front face upper side thereof. The attachment section 3 is configured so that the first accommodation unit 10, which can accommodate the first type articles P1, and the second accommodation unit 20, which can accommodate the second type articles P2, are detachable from attachment section 3.

The first accommodation unit 10 accommodates the aforementioned spherical first type articles P1 which are accommodated in a non-aligned state, as shown in the figure. On the other hand, the second accommodation unit 20 is configured to accommodate the second type articles P2 in a stacked and aligned state.

Each of these units will be explained below. The operation unit 4 is configured to be rotatable, for example, in a clockwise direction (in a direction of an arrow shown in the figure), subject to payment of consideration. For instance, after a user inserts a coin(s) into the coin insertion section 5, he or she rotates the operation unit 4 so that a first type article P1 is discharged into the first supply port 9. In addition, the second type article P2 is discharged from the second supply port 29 provided on the front side of the accommodation unit 20. The operation of the operation unit 4 is common in a state where the first accommodation unit 10 is attached thereto and a state where the second accommodation unit 20 is attached thereto.

The coin insertion section 5 for cash is configured to have a slit-like opening capable of inserting coins, wherein the opening is formed in a circular depression. Additionally, the return port 6 is configured so that when the inserted coins are returned in response to an operation of the cash return button 7, the retuned coins can be taken from the device.

The attachment section 3, as mentioned earlier, has an approximately rectangular opened structure surrounded by the left and right side walls 2*s*, the rear wall 2*r*, the top wall 2*u*, and the appropriately opened bottom wall 2*d*. At least the shape of a case of the main body 10*a* of the first accommodation unit 10 and that of the may body 20*a* of the second accommodation unit 20 are approximately the same as each other, except for the shapes of their front face sides. For example, the attachment section 3 is configured so that the accommodation unit 10 and the accommodation unit 20 can be detached by slidably moving it in the front and back directions of the main body 2.

On the bottom wall 2*d* side of the attachment section 3, a communicating portion 9*a* for supplying a first type article P1 to the first supply port 9 is provided. In addition, on the bottom wall 2*d* side thereof, a gear mechanism (gears 4*b*, 4*c*, 4*d*, 4*d*) engageable with gear components of the first accommodation unit 10 and the second accommodation unit 20 is provided.

In addition, on the bottom wall 2*d* side of the attachment section 3, as described later, a first member 41*a* of a first type article detection unit 40*a*, capable of detecting the presence or absence of the first type article(s) P1 corresponding to the bottom face portion of the first accommodation unit 10, and a second member 41*b* of a second type article detection unit 40*b*, capable of detecting the presence or absence of the second type article(s) P2 corresponding to the bottom face portion of the second accommodation unit 20, are provided.

Figure 2:
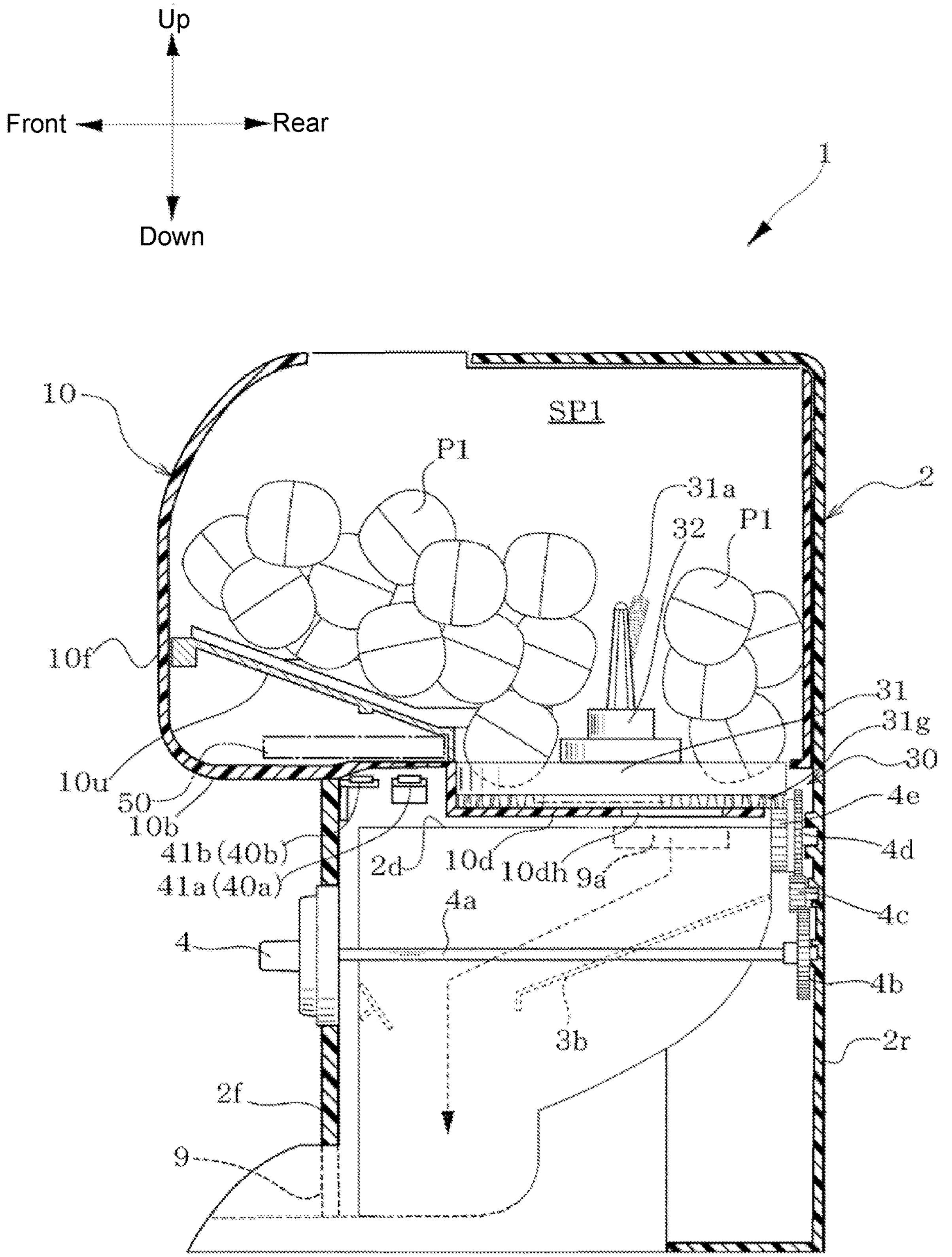
FIG. 2 is a vertical cross sectional view of a main part of the article supply device capable of supplying the first type articles.

A supply operation of the first type article P1 will be explained below, referring to FIGS. 2-9. FIG. 2 is a vertical cross sectional view of a main part of the article supply device 1 for supplying the first type articles P1.

As shown in FIG. 2, an operating shaft 4*a* of the operation unit 4 extends rearward. The operating shaft 4*a* extends to the rear wall 2*r*, and a first gear 4*b* is provided at a rear end thereof. The first gear 4*b* is rotatably supported on an inner face of the rear wall 2*r* and forms a gear mechanism by engaging with other gears, namely the second gear 4*c* and the third gear 4*d*. In addition, a fourth gear 4*e*, which is integrally formed with and concentric with the third gear 4*d*, is provided on the third gear 4*d*. The fourth gear 4*e* engages with the gear portion 31*g* on a lower side of a turntable 31 for supplying a first type article P1, which is later described. By rotating the operating unit 4, the turntable 31 of the first supply unit 30 can be rotated through the operating shaft 4*a*, the first gear 4*b*, the second gear 4*c*, the third gear 4*d*, and the fourth gear 4*e*, as described later, thereby allowing the supply of the first type article P1.

A discharge mechanism for delivering a first type article P1 from the first accommodation unit 10 attached to the attachment section 3, to the first supply port 9 is provided under the bottom wall 2*d* to which the first accommodation unit 10 is attached. The discharge mechanism, for instance, moves, to the first supply port 9, the first type article P1 which falls down from the communicating portion 9*a* (refer to FIG. 1) through a chute 3*b*, which is inclined downward in a lower front direction.

As shown in FIG. 2, the first supply unit 30 is equipped with a turntable 31 which is rotatably provided in an approximately circular accommodating recess 10*d* wherein the accommodating recess is formed at the bottom portion 10*b* of the first accommodation unit 10. This turntable 31 has a disc-shaped configuration in a plan view thereof, and is supported on a support shaft (not shown) and rotatably provided within the accommodating recess 10*d*.

Figure 3:
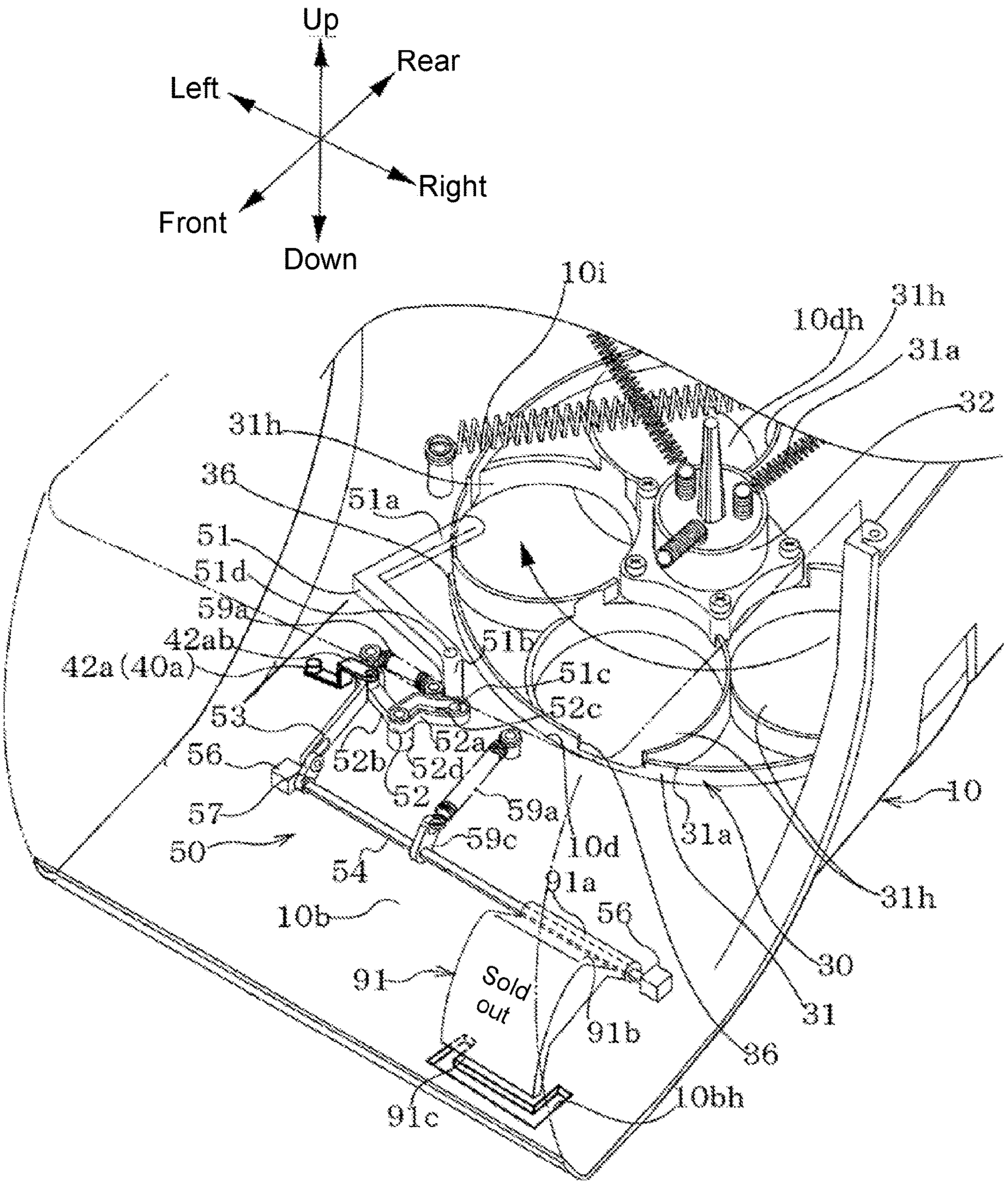
FIG. 3 is a perspective view of an internal structure of the accommodation unit for the first type articles.
Figure 4:
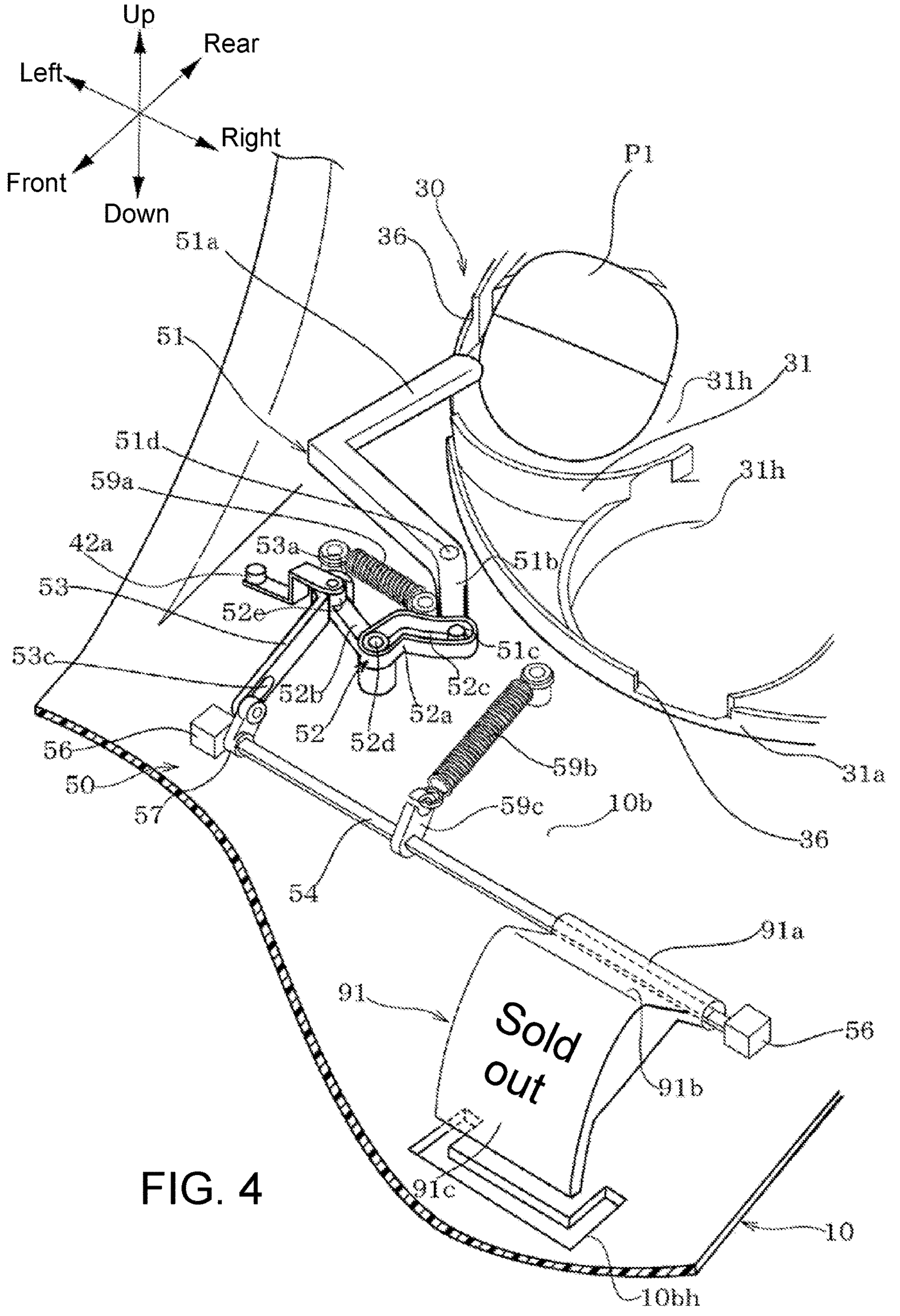
FIG. 4 is a perspective view thereof illustrating a detection state of the first type articles.

FIG. 3 is a perspective view of a main part of the internal structure of the first accommodation unit 10. FIG. 4 is an enlarged perspective view thereof for illustrating a detection state of the first type article P1. As shown in FIG. 3, two or more article holding holes 31*h*, for example five holes, are formed at equal intervals in a circumferential direction thereof (refer to FIG. 5). Additionally, a face gear-shaped annular gear portion 31*g* is provided on the outer peripheral edge of the lower end face of the turntable 31, and engages with the fourth gear 4*e*. Furthermore, at the rotation center on the upper face side of the turntable 31, a protruding part 32, for example, extending upward, is provided, and at the upper end of this protruding part 32, multiple spring agitating members 31*a* are arranged.

In addition, an article passage hole 10*dh* is provided in the accommodating recess 10*d*, so that the first type article P1 can fall into the communicating portion 9*a* of the main body 2. In other words, when the first accommodation unit 10 is attached to the main body 2, the first type article P1 falls through the article passage hole 10*dh* into the communicating portion 9*a* of the main body 2.

An inclined bottom portion 10*u* (refer to FIG. 2) is provided so as to be located closer to a front side of the first accommodation unit 10 than the accommodating recess 10*d*. The inclined bottom portion 10*u* forms a bottom face of an accommodation space SP1 for first type articles P1, and guides the first type articles P1 towards the turntable 31 side. A regulating member 10*i* etc., which is a spring, is provided in order to regulate the positions of the first type articles P1, so that the first type articles P1 located on an upper side of the article communicating portion 10*bh* may not move (downward) toward the article communicating portion 10*dh*.

On the lower side of an inclined bottom portion 10*e*, as shown in FIG. 3, a second member 42*a* of the first type article detection unit 40*a* is provided within the linking mechanism 50, so as to serve as a detection unit capable of detecting the presence or absence of the first type article(s) P1. This second member 42*a* is configured to perform an article detection based on its positional relationship with the first member 41*a*, which is described later (refer to FIGS. 5 and 8).

The linking mechanism 50, as shown in FIG. 3, is provided on a front side of the turntable 31 and includes a horizontally oscillating pin 51 capable of contacting the first type article P1, a first link member 52 connected to the horizontally oscillating pin 51, a second link member 53 connected to the first link member 52, a third link member 54 connected to the second link member 53, and a first notification unit 91, which is a notification part capable of notifying of the absence of the first type article P1 and which is connected to the third link member 54.

The horizontally oscillating pin 51 is provided so as to be horizontally rotatable through a support shaft 51*d* near the outer periphery of the turntable 31. A tip portion 51*a* of the horizontally oscillating pin 51 is, for example, bent in an approximately L-shape in a plan view, and a base portion 51*b* extends so as to be closer to the front side than a support shaft 52*d*. Further, a tension coil spring 59*a* engages with the base portion 51*b*, and the base portion 51*b* is pulled in the left direction. Therefore, the tip portion 51*a* can pass through a notch 36 and enter an article-holding hole 31*h*, which holds a first type article P1, by an urging force of the tension coil spring 59*a*.

A cylindrical projection 51*c* protruding upward is provided at the base portion 51*b* of the horizontally oscillating pin 51. The first link member 52, which engages with this projection 51*c*, is provided so as to be horizontally swingable about the support shaft 52*d*, which is provided so as to project from the bottom portion 10*b*. The first link member 52 comprises a first lever 52*a*, which extends and is slightly bent (so as to be an approximately L-shape) to one side (to the right side in the figure) from the support shaft 52*d*, and a second lever 52*b*, which extends toward the other side (to the left in the figure) so as to have a predetermined angle with respect to the first lever 52*a*. Further, a long hole 52*c* is formed in the first lever 52*a* along its longitudinal direction of the first lever 52*a*, and the projection 51*c* of the horizontally oscillating pin 51 loosely engages in this long hole 52*c*. By this configuration, the projection 51*c* serves as a movable link within the long hole 52*c*. On the other hand, a cylindrical part 52*e* (refer to FIG. 4) is provided at the tip of the second lever 52*b*, and the rear end 53*a* of a rod-shaped second link member 53, which extends in front and back directions relative to the cylindrical part 52*e*, is rotatably connected to the cylindrical part 52*e*.

The second link member 53 has a long slot 53*c*, which extends in the front and back directions at a front end thereof. The tip portion of the oscillating part 57, attached to the third link member 54, is movably engaged in this long slot 53*c*.

The third link member 54 is a rot-shaped member having an angular shape in a cross-sectional view thereof, and extends in left and right directions, and left and right ends thereof are rotatably supported through bearings 56. A first notification unit 91 is attached to the other end side of the third link member 54 (on the right side in the figure) which is opposite to the one end side to which the oscillating part 57 is attached (on the left side in the illustration). Additionally, a tension coil spring 59*b* is attached to the third link member 54 through an oscillation-assisting arm 59*c*. Consequently, the third link member 54 is supplementally biased in a clockwise direction when viewed from the right side face direction, so that an auxiliary force is applied the third link member 54 in a direction in which the first notification unit 91 is lifted upward.

The first notification unit 91 comprises an attachment base portion 91*a* fixed at a right end of the third link member 54, a base side plate 91*b* extending radially from the attachment base portion 91*a*, and a notification plate 91*c*, which bends downward from the tip of the base side plate 91*b* and curves along a rotational face. The outer face of the notification plate 91*c* is provided with an indication such as "Sold out." Additionally, a through-opening 10*bh* is formed in the bottom portion 10*b*, and the notification plate 91*c* can be exposed downward from the bottom portion 10*b* through the through-opening 10*b*.

Figure 5:
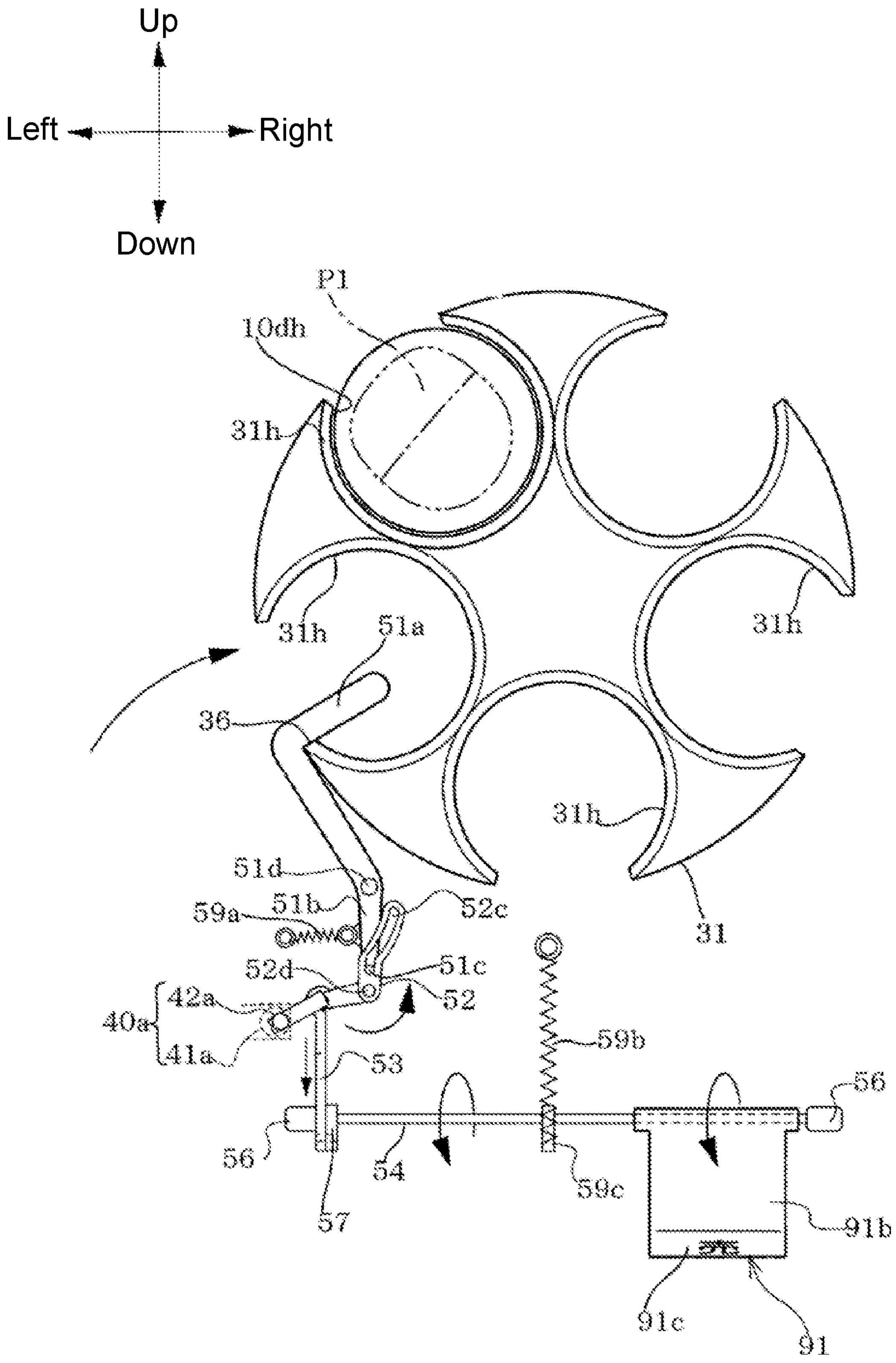
FIG. 5 is a diagram illustrating an operation of a linking mechanism of the accommodation unit for the first type articles.
Figure 6:
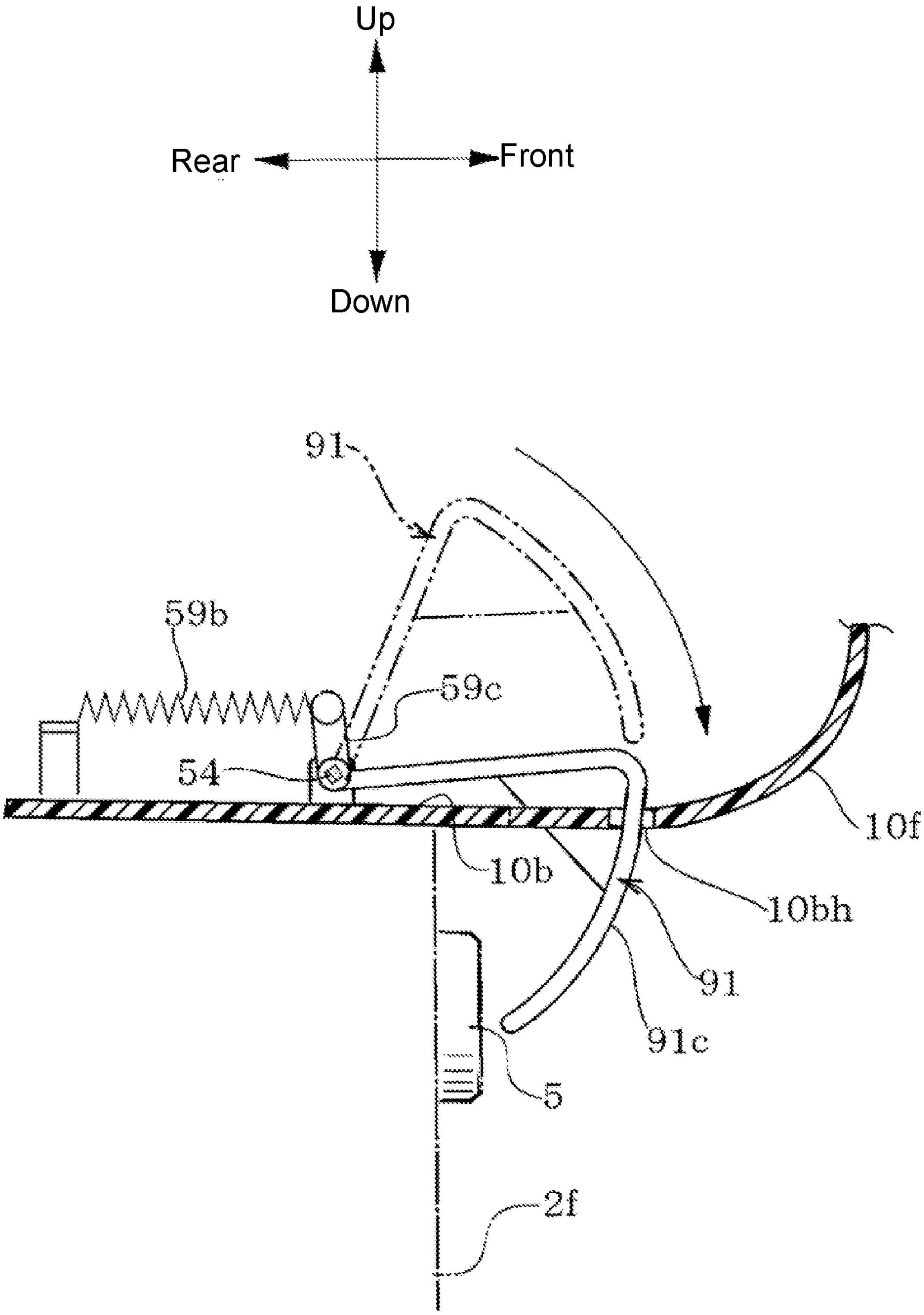
FIG. 6 is a schematic cross-sectional view of a main part of a notification unit for the first type articles, showing an operation thereof.
Figure 7:
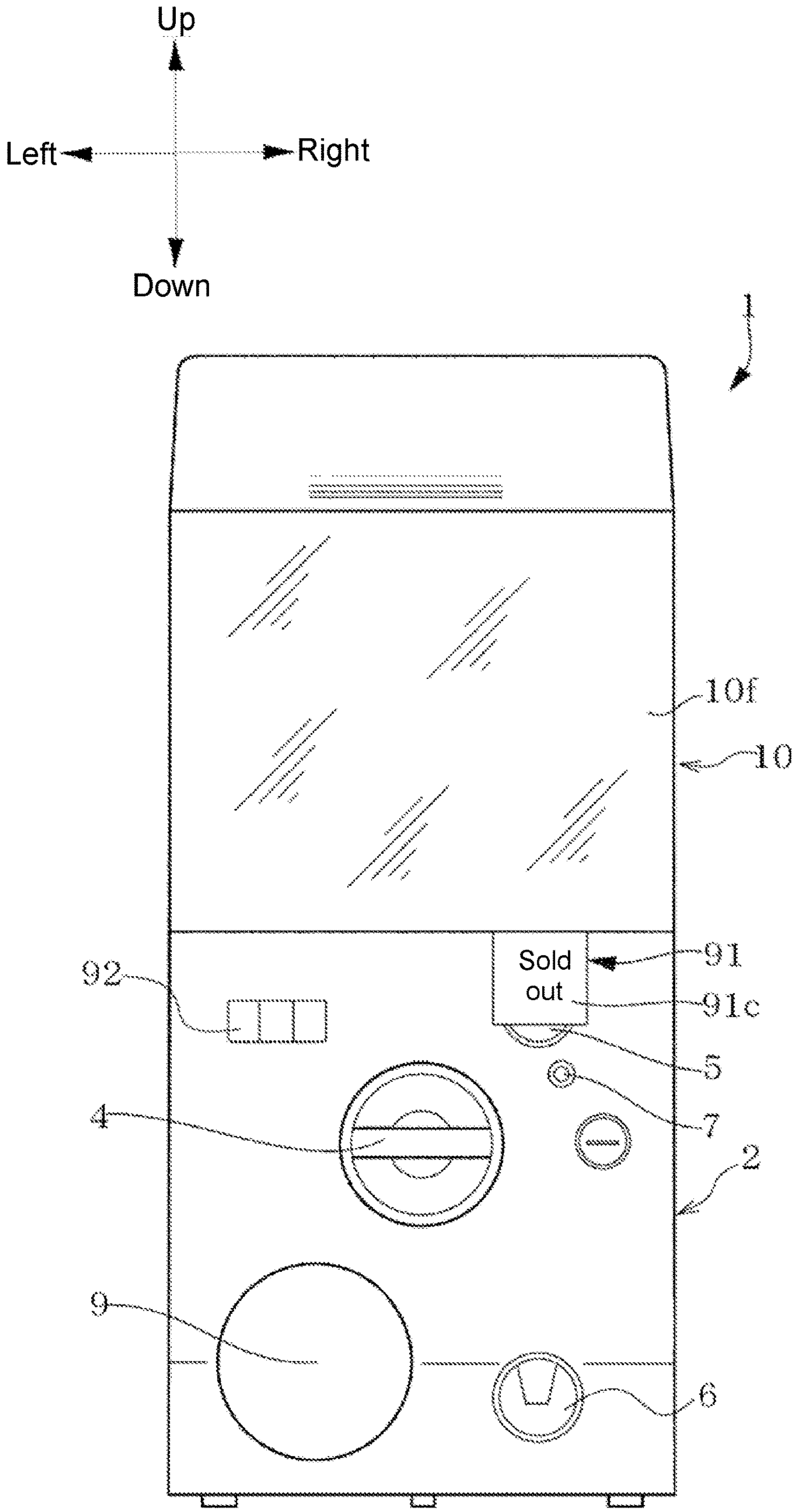
FIG. 7 is a front view of the article supply device in an operating state of the notification unit.

An operation in case where first type articles P1 are sold out, will be explained. FIG. 5 is an explanatory diagram illustrating the operation of the linking mechanism 50. FIG. 6 is a side view of the first notification unit 91 for illustrating an operation thereof, and FIG. 7 is a front view of the article supply device for illustrating an operation state of the first notification unit 91. As shown in FIG. 5, when the first type articles P1 run out in the first accommodation unit 10, the horizontal oscillating pin 51 deeply enters the article-holding hole 31*h* due to the tension coil spring 59*a*. As a result, the rotation lock of the first link member 52, which is imposed by the projection 51*c*, is released. This releases the lock of the rotation of the second link member 53 and the third link member 54. Consequently, the first notification unit 91 goes down in the front and lower direction due to its own weight, and the notification plate 91*c* passes through the through-opening 10*bh*, so as to be exposed below the bottom portion 10*b*. In other words, when the first notification unit 91 is released from the lock by the linking mechanism 50, it rotates in the front and down direction due to its own weight.

As shown in FIGS. 6 and 7, the notification plate 91*c*, which has rotated and gone down, protrudes outside through the through-opening 10*bh* against a pulling force of the tension coil spring 59*a*. Consequently, the first notification unit 91 turns into a state where the indication "Sold out," shown on the outer face of the notification plate 91*c*, is visible. Simultaneously, the notification plate 91*c* covers the front side of the coin insertion part 5. In this manner, the first notification unit 91 notifies "Sold out" at the upper right position close to the operation unit 4 and further prevents a coin(s) from being inserted in the coin insertion part 5. In addition, in this state, the second notification unit 92 functions as a second notification by emitting light at the upper left position close to the operation unit 4.

Figure 8:
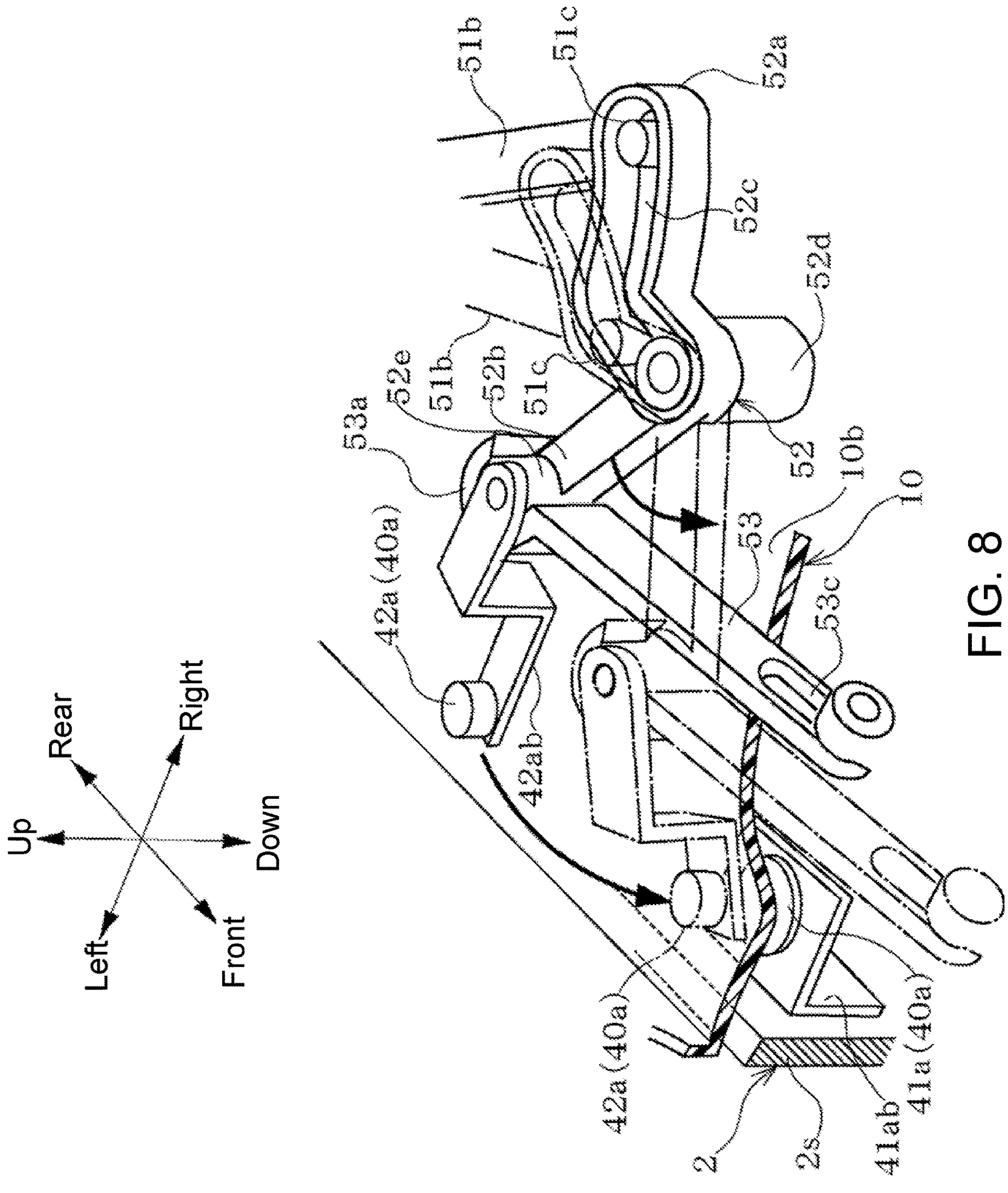
FIG. 8 is a partial enlarged perspective view of a detection structure for the first type articles.

Next, the notification mechanism of the second notification unit 92 will be explained. FIG. 8 is a partially enlarged perspective view of a detection structure for operating the second notification unit 92. The second notification unit 92 (refer to FIG. 7) is configured as a light-emitting part, which comprises, for example, a light-emitting element such as an LED. As shown in FIG. 8, the configuration for operating the second notification unit 92 (emitting light) includes, a first member 41*a* for the first type article, which is provided on a side of the main body 2, and a second member 42*a* for the first type article, which is provided within the linking mechanism 50.

The first member 41*a* for the first type article is configured as a magnetic sensor fixed and installed on the inside of the left side wall 2*s* of the main body 2 through, for example, a bracket 41*ab* etc. On the other hand, the second member 42*a* for the first type article has a magnet provided on an attachment part 42*ab* attached to one end of the first link member 52. In other words, the magnetic sensor and the magnet are configured to sandwich the bottom portion 10*b* of the first accommodation unit 10, and can get close to and face each other.

Figure 9:
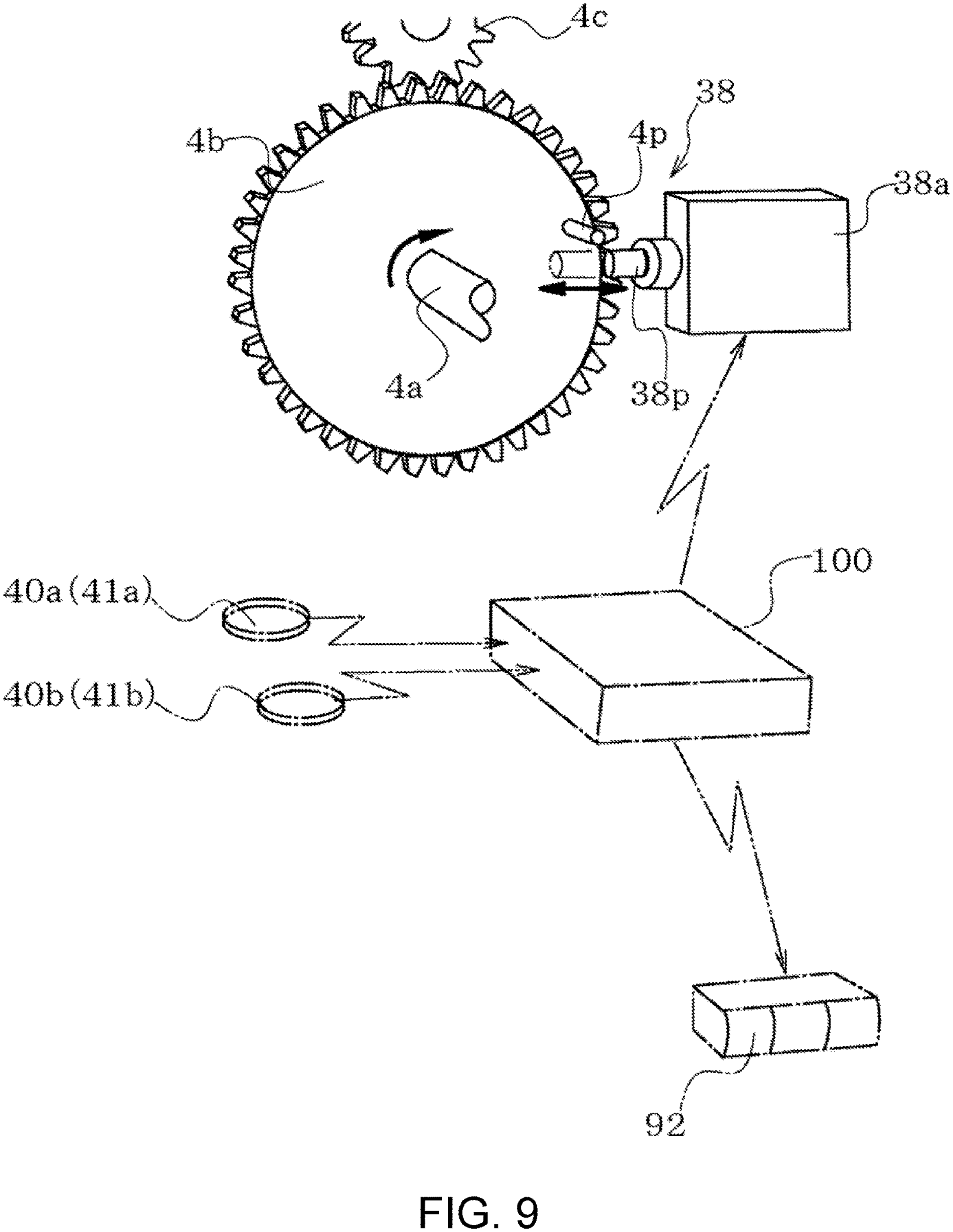
FIG. 9 is a diagram illustrating an operation of the notification unit and an operation mechanism of the lock unit.

In the first type article detection unit 40*a* configured in this manner, the magnetic sensor detects the magnetic force of the magnet when the magnetic sensor approaches the magnet, and transmits a detection signal to the control unit 100 (refer to FIG. 9). For example, when the first accommodation unit 10 does not accommodate the first type article P1, i.e., when the horizontally oscillating pin 51 is operated to deeply enter the article-holding hole 31*h*, and the first link member 52 moves, the second member 42*a* (magnet) approaches the first member 41*a* (magnetic sensor) (a state shown in FIG. 8).

FIG. 9 is an explanatory diagram illustrating the operation of the second notification unit 92 and the locking mechanism 38. When the first type articles P1 run out, the magnetic force of the magnet is detected by the magnetic sensor. The detection signal indicating there is not any first type article P1, obtained by the first type article detection unit 40*a* (first member 41*a*), is transmitted to the control unit 100. Based on this transmission signal, the control unit 100 controls the second notification unit 92 to emit light, for example, in a flashing or continuous lighting manner.

Additionally, when the first type article P1 is depleted, the operation of the lock unit 38, which prevents the operation performed by the operation unit 4, will be explained. As shown in FIG. 9, the lock mechanism 38 includes an engaging pin 4*p* of the first gear 4*b* attached to the operation shaft 4*a* of the operation unit 4, and a lock pin 38*p* of a lock drive unit 38*a* adjacent to the first gear 4*b*. For example, the lock drive unit 38*a* is configured to allow the lock pin 38*p* to advance toward or move back from the first gear 4*b* based on a signal from the control unit 100.

Therefore, when the first type articles P1 run out, the lock drive unit 38*a* advances the lock pin 38*p* toward the first gear 4*b* based on the detection signal sent from the first member 41*a*. As a result, the lock pin 38*p* engages with the engaging pin 4*p*, thereby preventing the rotation of the operation unit 4, so that the rotation of the turntable 31 is prevented, and the article supply operation is turned in a locked state.

It should be noted that when the first type articles P1 run out, the horizontal oscillating pin 51 oscillates as described above, and the tip portion 51*a* of the horizontal oscillating pin 51 enters the article-holding hole 31*h*, so that the tip 51*a* engages with the notch 36 of the turntable 31, thereby regulating a rotational movement of the turntable 31. However, since, as described above, the lock mechanism 38 prevents any rotation operation of the operation unit 4, it is possible to avoid loads on the horizontal oscillating pin 51 or the turntable 31.

Figure 10:
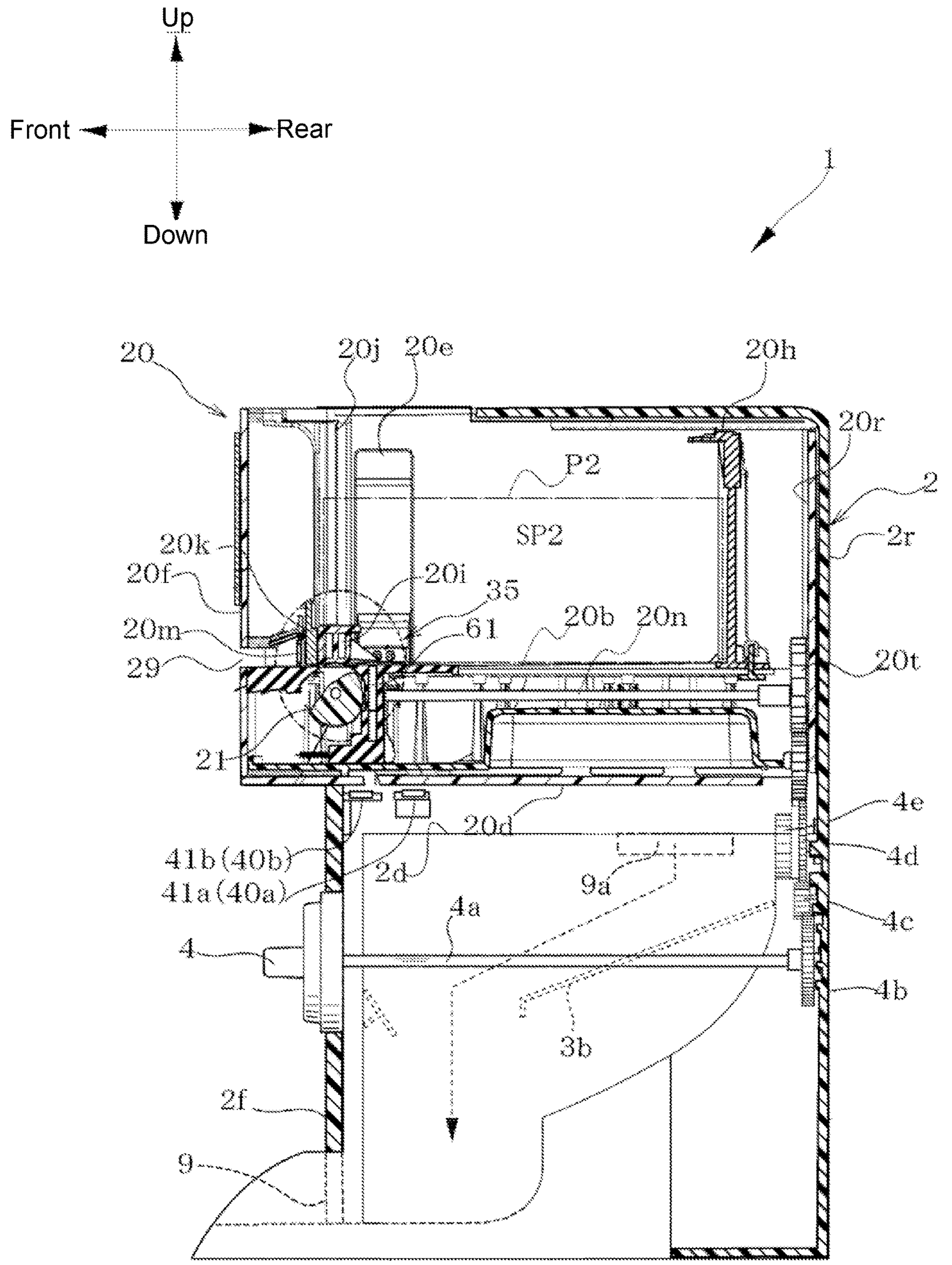
FIG. 10 is a vertical cross-sectional view of a main part of the articles supply device capable of providing the second type articles.
Figure 11:
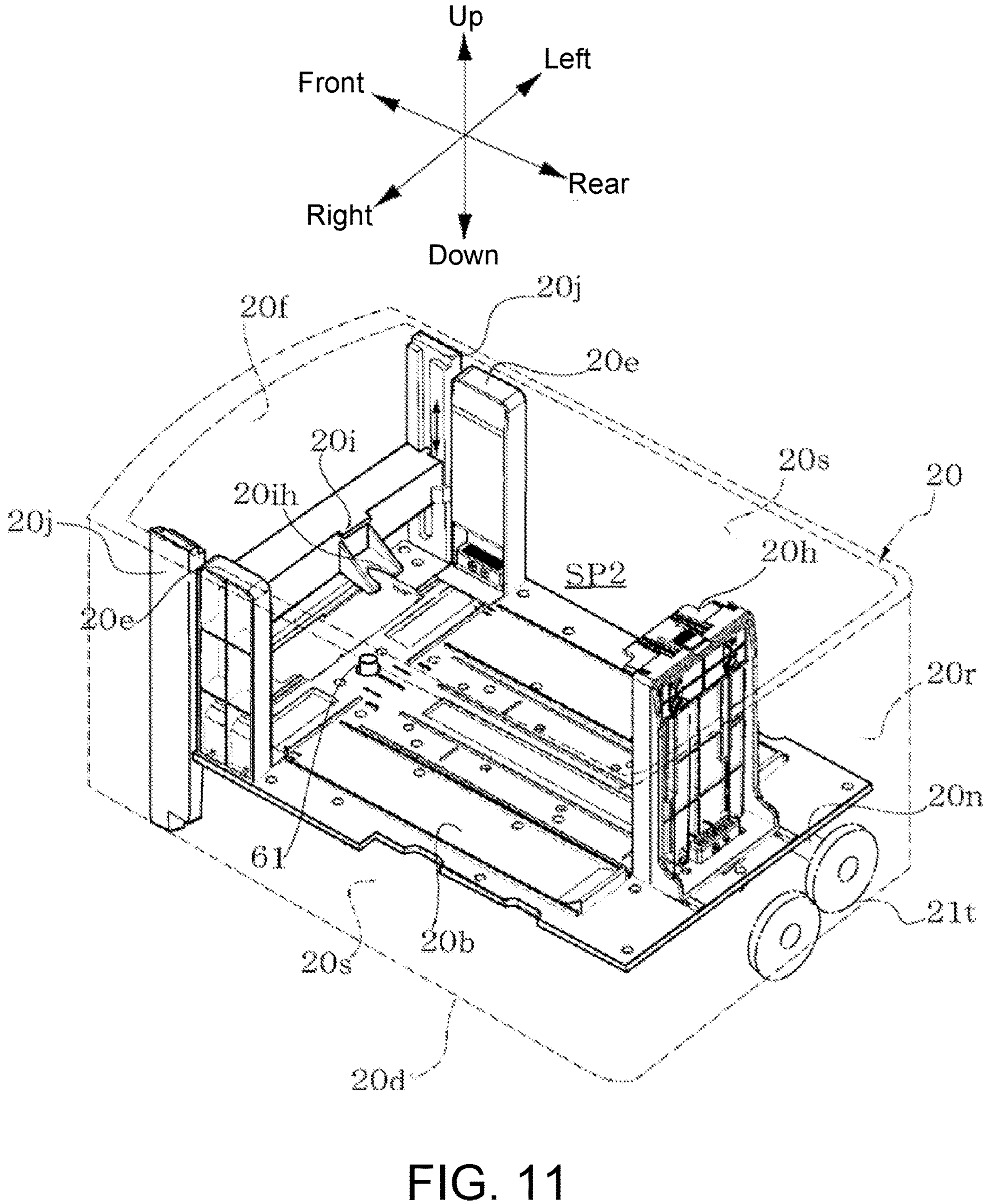
FIG. 11 is a perspective view of an internal structure of the accommodation unit for the second type articles.

FIG. 10 is a sectional view of a main part of the article supply device in a state where the second accommodation unit 20 is attached thereto. FIG. 11 is a perspective view of the internal structure of the second accommodation unit 20. In FIG. 10, the main body 2 has the same configuration shown in FIG. 2, so that explanation thereof is omitted. As shown in FIGS. 10 and 11, the second accommodation unit 20 is a box-shaped structure with an opening on the upper side thereof, and is formed by the front wall 20*f* on the front side, the rear wall 20*r* on the rear side, and the side walls 20*s* on the left and right sides, and the bottom wall 20*d*. The internal accommodation space SP2 is configured as a rectangular space in a box shape. The article placement unit 20*b*, which forms the bottom portion of the accommodation space SP2, is provided at a high position so as to be spaced from the bottom wall 20*d* and to be flat so that second type articles P2 may be stacked and accommodated thereon. Additionally, in the accommodation unit 20, a discharge roller 21 of the second supply unit 35, which discharges a second type article P2 from the second supply port 29, is provided between the article placement unit 20*b* and the bottom wall 20*d* (refer to FIG. 10).

Furthermore, the second accommodation unit 20 is equipped with a gear portion 20*t* along the rear wall 2*r* of the second accommodation unit 20. In a state where the accommodation unit 20 is attached thereto, as shown in FIG. 10, the lowermost gear of the gear portion 20*t* engages with and is connected to the third gear 4*d*, which is driven by the operation unit 4.

As shown in FIGS. 10 and 11, in the accommodation space SP2, a pair of left and right guides 20*e* is provided at a position near the front side of the space, and a rear guide 20*h* is provided at a position near the rear of the space, so as to rise from the article placement unit 20*b*. Furthermore, on the front side of the left and right guides 20*e*, a pressing part 20*i* is provided to press the second type articles P2 downward from an upper side thereof in a state where the second type articles P2 are accommodated and stacked. The pressing part 20*i* is a rectangular weight having a longer side in the left-right directions and is held movably in the up-and-down directions by rail-shaped holding sections 20*j*, each of which has a groove formed on the front side of the left and right guides 20*e*.

Moreover, the left and right guides 20*e* are provided movably in the left and right directions on the article placement unit 20*b*, and the rear guide 20*h* is movably provided in the front and back directions on the article placement unit 20*b*. Therefore, second type articles P2 in different sizes can be accommodated in a stacked state, by moving and adjusting the left and right guides 20*e* and the rear guide 20*h*.

On the front side of the pressing part 20*i*, a front end guide part 20*k*, which gets engaged in article discharge, is provided along the pressing part 20*i*. This front end guide part 20*k* is arranged just behind a swingable shutter 20*m* which opens and closes the supply port 29. The front end guide part 20*k* guides a second type article P2 so as to be discharged one by one upon discharge of the second type article P2, and the height thereof from the article placement unit 20*b* is adjustable. Further, the front end guide part 20*k* is adjusted according to the thickness of the second type articles P2.

Figure 12:
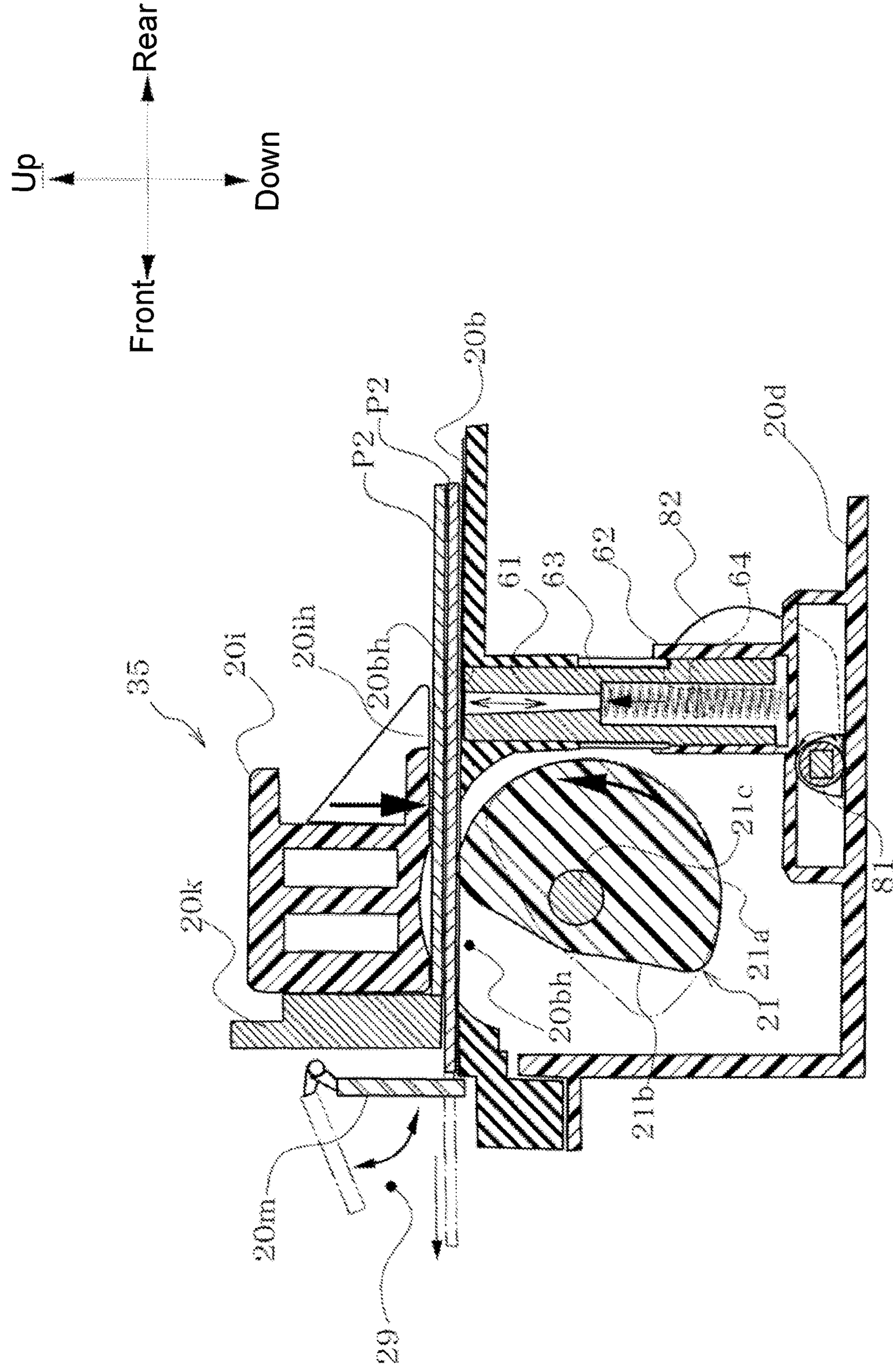
FIG. 12 is an enlarged cross-sectional view of the supply unit for the second type articles.

The discharge roller 21, which is located below the article placement unit 20*b* and faces the pressing part 20*i*, is provided as a part rotating along a horizontal direction. As shown in a side view in FIG. 12, the discharge roller 21 includes an arc outer face 21*a* and a non-arc outer face 21*b* whose diameter is smaller than that of the arc outer face 21*a*. Therefore, when the discharge roller 21 is rotated about the rotation axis 21*c*, the arc outer surface 21*a* is brought in contact with a lower face of the second type article P pressed down by the pressing part 20*i* (refer to an enlarged part in FIG. 12). By the rotation in this contact state of the arc outer face 21*a*, the second type article P2 is pushed forward. In other words, the arc outer face 21*a* slightly protrudes upward from the placement opening 20*bh* formed in the article placement unit 20*b* and is brough in contact with the lower face of the second type article P2, so that the second type article P2 is slid forward and discharged from the supply port 29. In the discharge (supply) of the articles P2 by the second supply section 35, the second type articles P2 are discharged one by one in a sequential order from the bottommost second article P stacked and arranged in the accommodation unit 20.

In addition, the discharge roller 21 is connected to a connection shaft 20*n* (refer to FIG. 10) extending from one axis portion of the gear portion 20*t* provided along the rear wall 20*r* toward the discharge roller 21 side (front side), and a gear (not shown) provided on the front side of the connection shaft 20*n*. Therefore, when the second accommodation unit 20 is attached to the main body 2, the discharge roller 21 is rotationally driven by the operation unit 4, which becomes operable by a coin insertion.

An up and down moving pin 61 capable of contacting the second type article P2 from a lower side of the article placement unit 20*b* is provided on the rear side of the discharge roller 21, as a detecting mechanism which detects the presence or absence of the second type articles P2. The up and down moving pin 61 is held movably in up and down directions by a pin holding part 62 and is biased upward by a compressive coil spring 63 provided inside the pin so that, when there is not any second type article(s) P2, it protrudes above the article placement unit 20*b* from the placement opening 20*bh*. It is noted that a notch opening 20*ih* corresponding to the placement opening 20*bh* is formed in the pressing part 20*i*, thereby allowing a protruding operation of the up and down moving pin 61.

Figure 13:
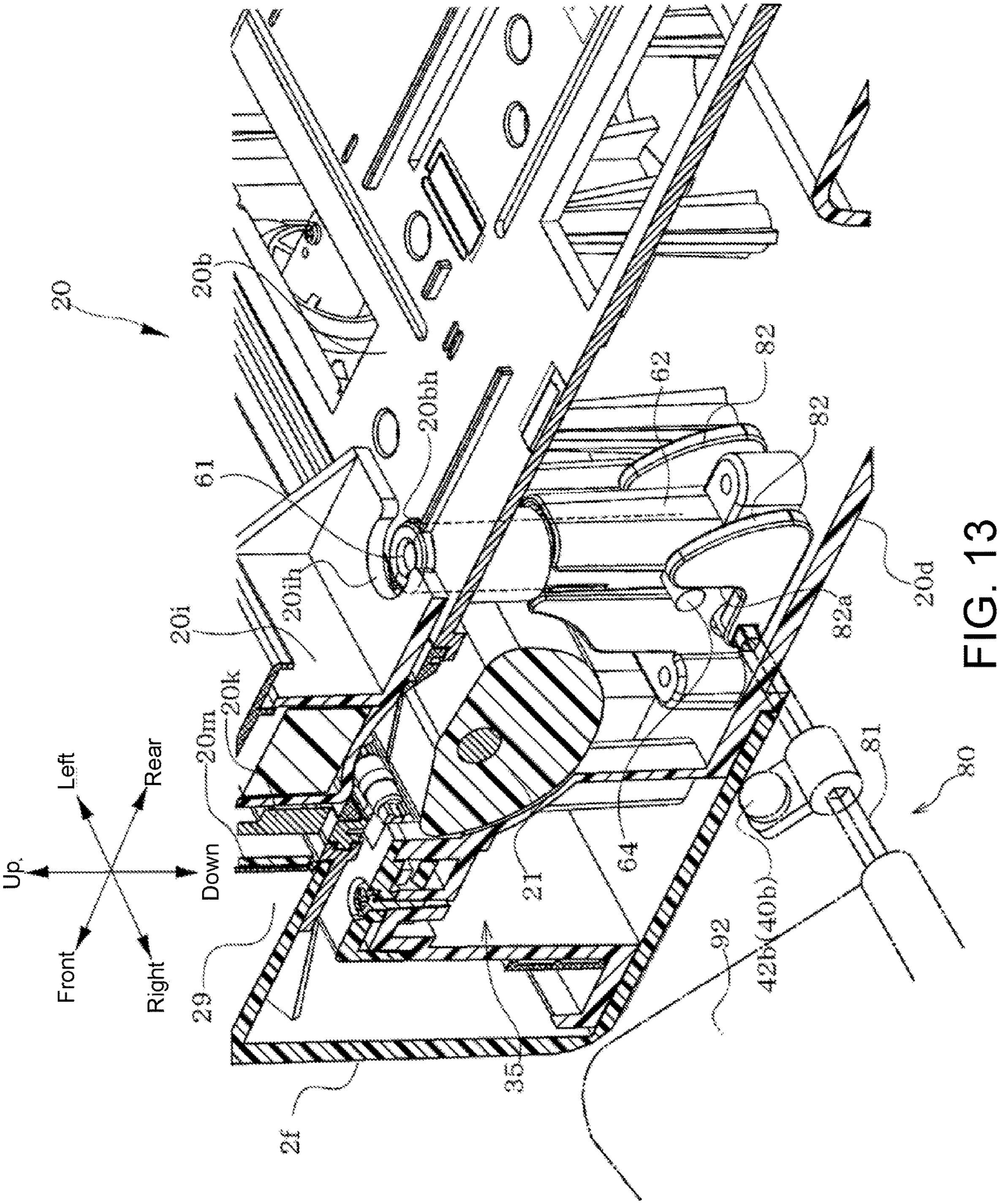
FIG. 13 is a partial cross-sectional perspective view of a main part of the accommodation unit for the second type articles.
Figure 14:
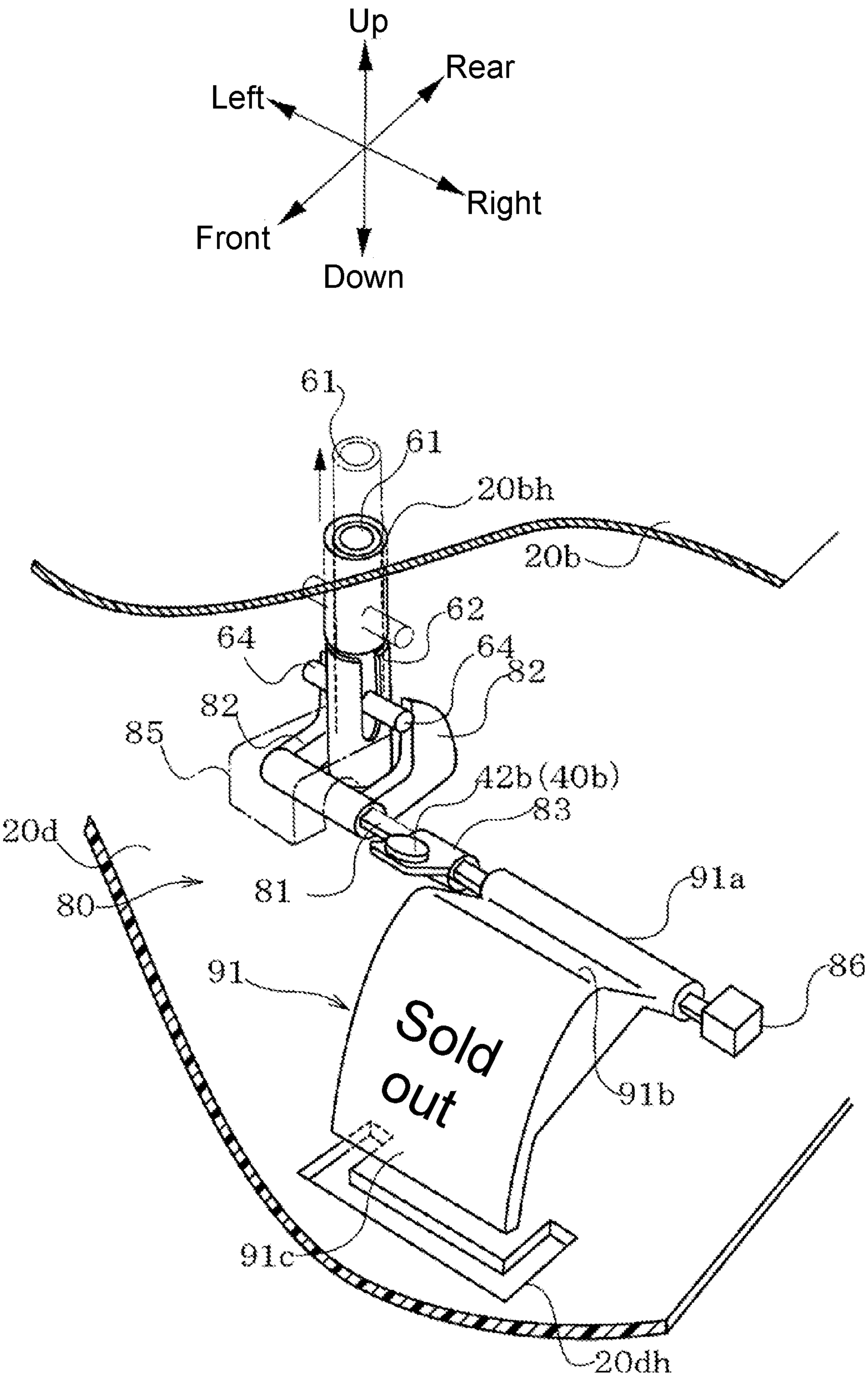
FIG. 14 is a schematic perspective view of main part of a linking mechanism in the accommodation unit for the second type articles.

FIG. 13 is an enlarged cross-sectional perspective view of the second supply unit 35 of the second accommodation unit 20. FIG. 14 is a schematic perspective view of a main part of the linking mechanism 80 of the second accommodation unit 20. As shown in FIGS. 13 and 14, the up and down moving pin 61 is connected to the linking mechanism 80 having a main shaft portion 81 as a rotational axis, which is described later. And, a second type article detection unit 40*b* including a second member 42*b* for second type articles is provided as a detection part which uses the movement of the linking mechanism 80.

The second type article detection unit 40*b* includes the first member 41*b* for the second type articles (refer to FIGS. 1 and 10) and the second member 42*b* for the second type articles. The first member 41*b* for the second type articles is fixed to and installed at the front lower part of the attachment section 3 of the main body 2 through a bracket, and is configured, for example, as a magnetic sensor. As shown in FIG. 13, the second member 42*b* for the second type articles is rotatably and movably attached to the main shaft member 81 of the linking mechanism 80. For example, the second member 42*b* for second type articles, which is a magnet, is provided in a swingable portion 83, which extends in a radial direction of rotation of the main shaft member 81. The second member 42*b* for the second type articles is provided as a movable magnet with respect to the first member 41*b* for the second type articles, and is detected by the first member 41*b* for the second type articles. Similar to the first type article detection unit 40*a* shown in FIG. 9, based on the detection signal, light is emitted from the second notification unit 92. Additionally, as shown in FIG. 9, it also functions as a detection unit, which drives the lock unit 38.

The main shaft member 81 is rotatably supported at left and right ends thereof by bearing portions 85 and 86 (refer to FIG. 14). On one end side of the main shaft member 81, hook-shaped engagement portions 82, which extend in a direction of the rotational radius of the shaft portion 81 and have an engaging face 82*a* respectively, are provided. The tip side of each of the hook-shaped engagement portions 82 can engage with one of the engaging projections 64 of the up and down moving pin 61. The pair of engagement portions 82 is provided at a position where the pin holding part 62, which movably holds the up and down moving pin 61 in the up and down directions, is sandwiched by the engagement portions 82 on the left and right sides thereof.

On the other end side of the shaft portion 81 (a side opposite to the up and down moving pin 61), a notification unit 91 for second type articles P2 is provided. The first notification unit 91 has an attachment base portion 91*a*, a base side plate portion 91*b* extending from the attachment base portion 91*a* in the direction of the rotation radius thereof, a notification plate portion 91*c*, which is curved downward and bended from the base side plate portion 91*b* so that the first notification unit for the second articles P2 has the same structure as that of the first notification unit 91 for the first type articles P1 shown in FIG. 4. The first notification unit 91 is provided so that a force that tends to rotate in a front and lower direction is constantly applied the first notification unit 91 by its own weight. However, in a state where the second type articles P2 are accommodated (a state shown in FIG. 12), the first notification unit 91 is prevented from rotating in a front and down direction by the engaging projections 64 of the up and down moving pin 61.

The engaging projections 64 projecting on both sides of the pin holding part 62 are provided on the up and down moving pin 61. And when there is a second type article(s) P2, the engaging projections 64 are positioned on the lower side of the pin holding part 62 and engage with the engaging faces 82*a* of the engagement portions 82, thereby preventing the rotation of the shaft portion 81.

Figure 15:
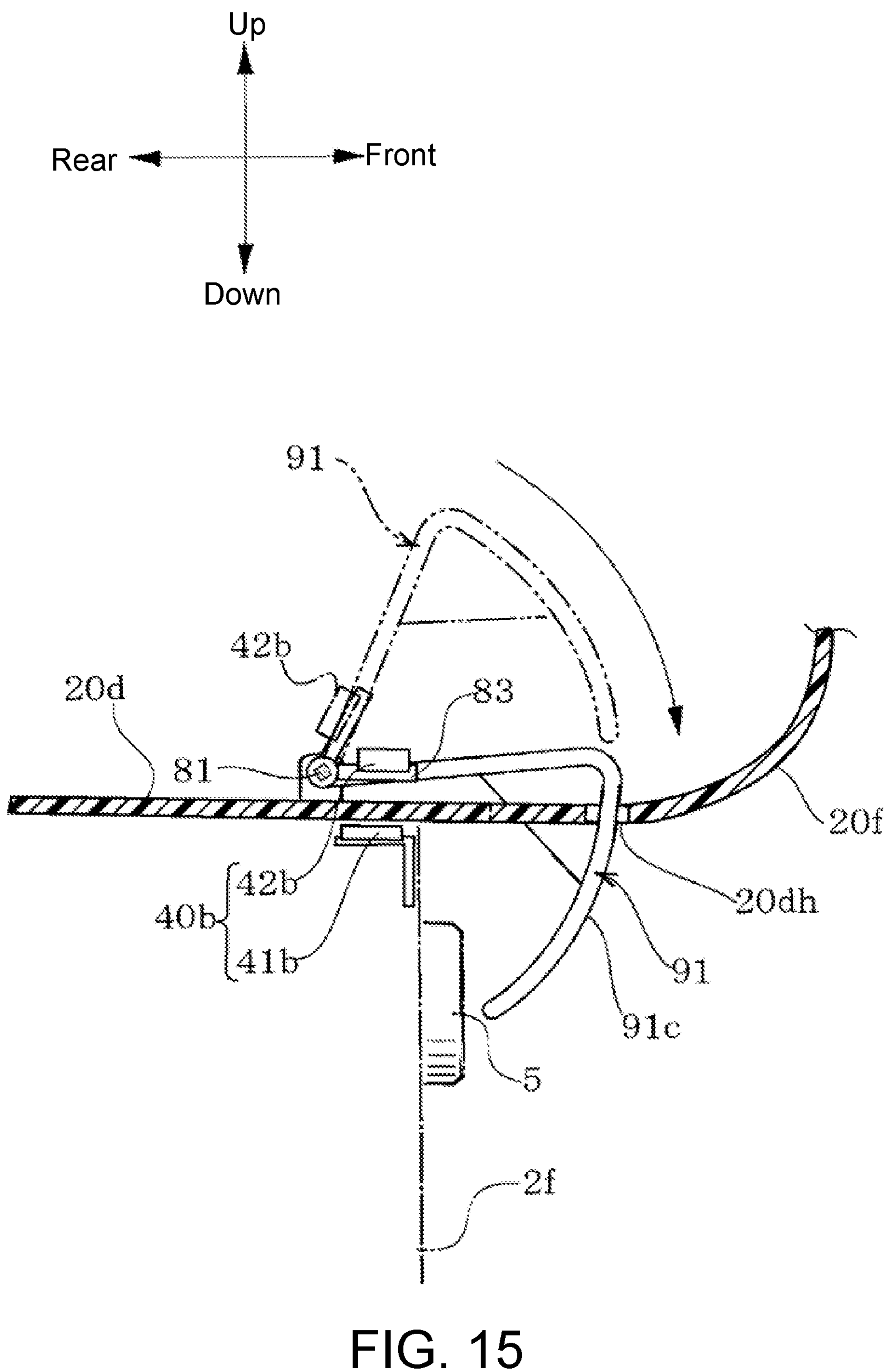
FIG. 15 is a schematic cross-sectional view of a main part of the notification unit for the second type articles showing an operation thereof.
Figure 16:
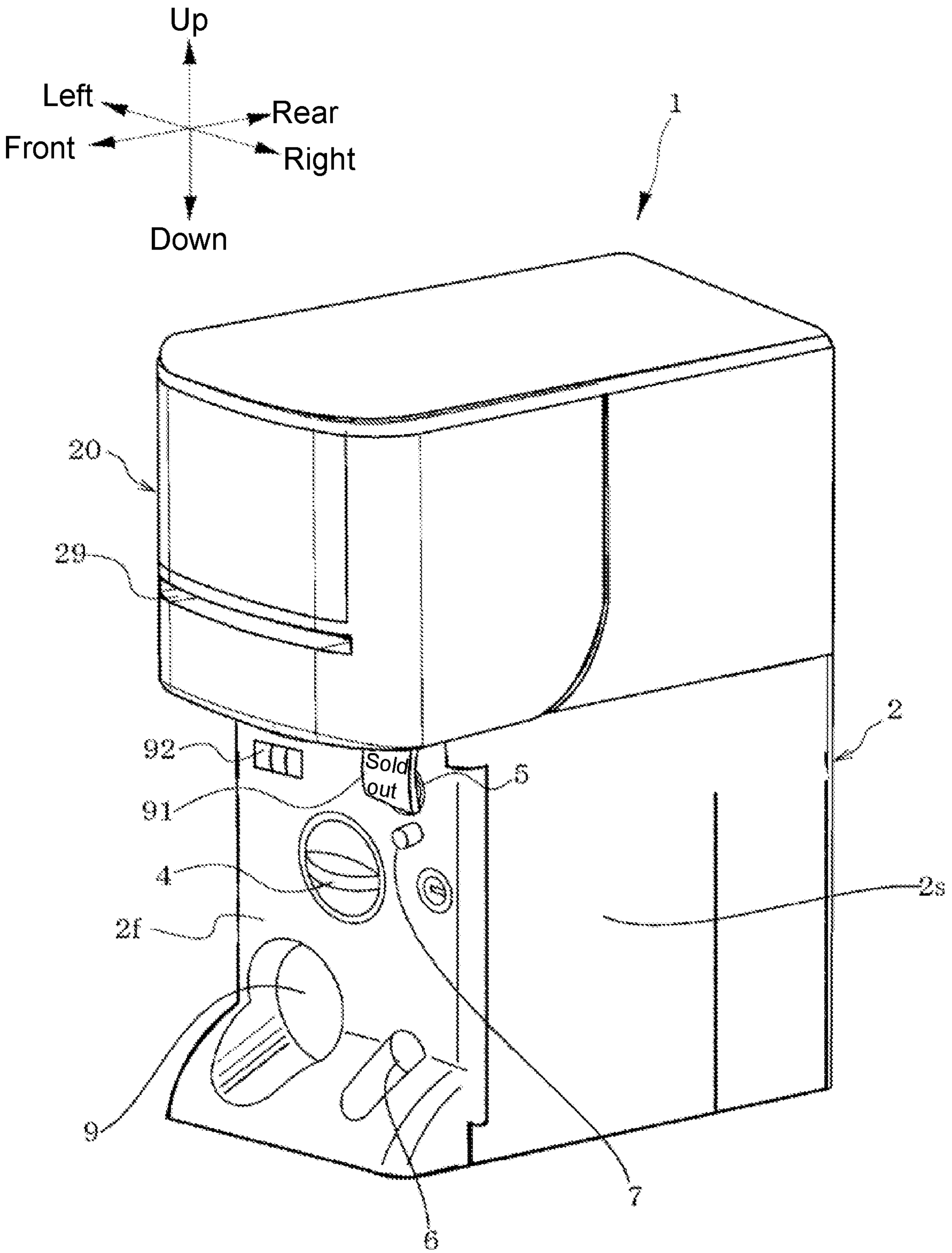
FIG. 16 is a perspective view of the articles supply device in an operational state of the notification section for the second type articles.

FIG. 15 is a schematic sectional view of a main part for showing an operation of the first notification unit 91. FIG. 16 is a perspective view of the article supply device 1 in an operating state of the first notification unit 91. When the second type articles P2 run out, and the up and down moving pin 61 moves upward by the compression coil spring 63 (as indicated by imaginary lines in FIG. 14), the engagement between the locking projections 64 and the engagement faces 82*a* is released. As a result, the first notification unit 91 rotates forward and downward due to its own weight. As shown in FIGS. 15 and 16, after that, the state of the first notification unit 91 is similar to the case of the first accommodation unit 10, wherein the notification plate portion 91*c* is positioned to cover the front side of the coin insertion unit 5, so that "Sold out" is displayed on the front face of the device. Thus, since the coin insertion unit 5 is covered with the first notification unit 91, the coin insertion becomes impossible.

Further, as shown in FIG. 15, the second member 42*b* for the second type articles provided on the main shaft member 81 rotates toward the front side due to the rotation of the main shaft member 81. As a result, the second member 42*b* for the second type articles approaches the first member 41*b* for the second type articles, i.e., the magnet approaches the magnetic sensor. Thus, when the second type articles P2 run out, the second member 42*b* for the second type articles (magnet) gets close to the first member 41*b* for the second type articles (magnetic sensor), and a detection signal is sent to the control unit 100 based on a magnetic force detection, so that the second notification unit 92 emits light.

As described above, when the detection parts, that is, the first type article detection unit 40*a* or the second type article detection unit 40*b* of the article supply device 1 according to the present embodiment, detect absence of the articles (first type articles P1 or second type articles P2) in the device. At least the lock unit 38 is operated, thereby preventing the supply of either the first type articles P1 or the second type articles P2. In addition, when there is no articles, the "Sold out" can be displayed.

A notification unit for making, to the outside of the device, a notification that there is no first type article P1 or that there is no second type article P2 in the device, is provided in the article supply device 1 according to the present embodiment, and the device has a function for making a notification to a customer, achieved by a visually recognizable recognition means provided on an outside face of the device. Therefore, customers can obtain this information before operating the device, thereby avoiding unnecessary operations.

In the article supply device 1 according to the present embodiment, one of the notification units (the first notification unit 91) can notify the absence of articles by the movement of the display plate. Moreover, the movement of the display plate allows, for example, an operation such as closing the coin insertion unit 5, thereby enhancing the usability of the device. Furthermore, in the other second notification unit 92 a notification can be performed by light emission, such as flashing lights, thereby enhancing the recognition effect of the notification.

According to the article supply device 1 of the present embodiment, the first notification unit 91 and the second notification unit 92 are configured to making a notification near the operation unit 4, so that it is possible to certainly avoid unnecessary device operations performed by a customer.

In the article supply device 1 according to the present embodiment, the operation unit 4 for supplying an article is locked by the locking unit 38, so that it is possible to prevent the operation of the operation unit when any article (the first type articles P1 or the second type articles P2) is not present, thereby avoiding unnecessary operations by customers. Additionally, the lock unit 38 can maintain a reliable lock state without imposing unnecessary loads on the drive unit of the device.

Both the first type article detection unit 40*a* and the second type article detection unit 40*b* of the article supply device 1 according to the present embodiment, use a sensing method based on position changes of the first members 41*a*, 41*a*, and the second members 42*a*, 42*b* in a non-contact manner, using, for example, magnetic force. This allows easy information transfer between the first or second accommodation units 10, 20, and the main body 2.

Moreover, the first type article detection unit 40*a* and the second type article detection unit 40*b*, which are detection units, respectively have detection structures corresponding to the different structures, in which the structure of the first accommodation unit 10 is different from that of the second accommodation unit 20. Thus, these detection units can deal with both of the accommodation units 10, 20 having such different structures.

The embodiments of the present invention are described above, but the present invention can be appropriately modified within the scope of its technical concept. For example, the structure of the article supply device 1 in the above-described embodiment, and the structure of the first accommodation unit 10 and the second accommodation unit 20 are not limited to those shown in the drawings.

As described above, the following matters are described in this specification.

(1) An article supply device capable of supplying first and second type articles. The article supply device comprises a main body, an accommodation unit for accommodating articles, a supply unit for supplying the articles accommodated in the accommodation unit, a lock unit which prevents the articles from being supplied from the supply unit; and a detection unit capable of detecting the presence or absence of first type articles and the presence or absence of the second type articles accommodated in the accommodation unit, wherein the lock unit is turned into a lock state, on condition that the absence of the articles is detected by the detection unit.

(2) The article supply device according to (1), further includes a notification unit which makes, to an outside, a notification that there is no article when the detection unit detects that there is no articles.

(3) In the article supply device according to (2), the notification unit includes a first notification unit and a second notification unit, and the first notification unit is configured so as to be movable, and the second notification unit is configured so as not to be movable.

(4) In the article supply device according to (3), the first notification unit is configured to make the notification that there is no article, by movement of a display plate, and the second notification unit is configured to make the notification that there is no article by light emission of a light emitting unit.

(5) In the article supply device according to either (3) or (4), the first notification unit is provided in the accommodation unit, and the second notification unit is provided on the main body.

(6) In the article supply device according to any one of (3) to (5), the main body includes a coin insertion section, and the first notification unit is operated so that no coin can be inserted in the coin insertion section, when the detection unit detects that there is no article.

(7) In the article supply device according to any one of (3) to (6), the main body includes an operation unit for performing an operation for making the article to be suppliable from the supply unit, and the first notification unit and the second notification unit are configured to make a notification near the operation unit.

(8) In the article supply device according to any one of (1) to (7), the main body includes an operation unit for performing an operation for making the article to be suppliable from the supply unit, and the operation unit is operable when the lock unit is in a lock release state.

(9) In the article supply device according to any one of (1) to (8), the detection unit includes a first member provided on the main body in a fixed state, and a second member movably provided on the accommodation unit.

(10) In the article supply device according to (9), the first member and the second member of the detection unit in a state where no article is accommodated in the accommodation unit get closer to each other than those in a state where the articles are accommodated in the accommodation unit.

(11) In the article supply device according to (9) or (10), the second member is a magnet, and the detection unit detects that there is no article, based on a magnetic force generated when the first member gets close to the second member.

(12) In the article supply device according to (9) to (11), the accommodation unit is configured so as to be detachable from the main body, and the first member is provided below the accommodation unit attached to the main body, and at a position where the second member can get close thereto.

(13) In the article supply device according to any one of (9) to (12), the first member includes one first member, which detects the absence or presence of the first type article, and another first member, which detects the absence or presence of the second type article, the one first member and the another first member are provided at different positions from each other in the main body.

(14) In the article supply device according to any one of (1) to (13), the accommodation unit includes a first accommodation unit and a second accommodation unit, the first accommodation unit is configured so as to be able to accommodate the first type articles, and the second accommodation unit is configured so as to be able to accommodate the second type articles.

(15) In the article supply device according to (14), the first accommodation unit is configured so that the first type articles can be accommodated in a non-aligned state, and the second type articles can be accommodated in in an aligned state.

(16) In the article supply device according to any one of (14) or (15), the main body is configured so that the first accommodation unit and the second accommodation unit are replaceable with each other.

(17) In the article supply device according to (16), the detection unit includes a first detection unit and a second detection unit, wherein the first detection unit detects the absence or presence of the first type articles, and the second detection unit detects the absence or presence of the second type articles.

(18) In the article supply device according to (17), the first detection unit is configured so as to be able to detect the absence or presence of the first type articles when the first accommodation unit is attached to the main body, and the second detection unit is configured so as to be able to detect the absence or presence of the second type articles when the second accommodation unit is attached to the main body.

REFERENCE NUMERALS

1 Article supply device
2 Main body
4 Operation unit
5 Coin insertion section
10 First accommodation unit (accommodation unit)
20 Second accommodation unit (accommodation unit)
30 First supply unit (Supply unit)
35 Second supply unit (Supply unit)
38 Lock unit
**40*a*** First type article detection unit (detection unit)
**40*b*** Second type article detection unit (detection unit)
**41*a*** First member for first type articles (first member)
**41*b*** First member for second type articles (first member)
**42*a*** Second member for first type articles (second member)
**42*b*** Second member for second type articles (second member)
91 First notification unit (notification unit)
92 Second notification unit (notification unit)
P1 First articles (Articles)
P2 Second articles (Articles)

The invention claimed is:

1. An article supply device capable of supplying first type articles and second type articles comprising: a main body; an accommodation unit which accommodates articles; a supply unit for supplying one of the articles accommodated in the accommodation unit; a lock unit which prevents the articles from being supplied from the supply unit; and a detection unit capable of detecting presence or absence of the first type articles and presence or absence of the second type articles accommodated in the accommodation unit, wherein the lock unit is turned into a lock state, on condition that the absence of the articles is detected by the detection unit, the detection unit includes a first detection unit and a second detection unit, the first and second detection units each include a first member provided on the main body in a fixed state, and a second member movably provided on the accommodation unit, and the first member includes one first member of the first detection unit, which detects absence or presence of the first type articles, and another of the first members includes another first member of the second detection unit, which detects absence or presence of the second type articles, the one first member and the another first member are provided at different positions from each other in the main body.

2. The article supply device according to claim 1, wherein the accommodation unit includes a first accommodation unit and a second accommodation unit, the first accommodation unit is configured so as to be able to accommodate the first type articles, and the second accommodation unit is configured so as to be able to accommodate the second type articles.

3. The article supply device according to claim 2, wherein the first accommodation unit is configured so that the first type articles can be accommodated in a non-aligned state, and the second type articles can be accommodated in in an aligned state.

4. The article supply device according to claim 2, wherein the main body is configured so that the first accommodation unit and the second accommodation unit are replaceable with each other.

5. The article supply device according to claim 1, further including a notification unit which makes, to an outside, a notification that there is no articles when the detection unit detects that there is no articles.

6. The article supply device according to claim 5, wherein the notification unit includes a first notification unit and a second notification unit, and the first notification unit is configured so as to be movable, and the second notification unit is configured so as not to be movable.

7. The article supply device according to claim 6, wherein the first notification unit is configured to make the notification that there is no article, by movement of a display plate, and the second notification unit is configured to make the notification that there is no article by light emission of a light emitting unit.

8. The article supply device according to claim 6, wherein the first notification unit is provided in the accommodation unit, and the second notification unit is provided on the main body.

9. The article supply device according to claim 6, wherein the main body includes a coin insertion section, and the first notification unit is operated so that no coin can be inserted in the coin insertion section when the detection unit detects the absence of the articles.

10. The article supply device according to claim 6, wherein the main body includes an operation unit for performing an operation for making the one of articles to be suppliable from the supply unit, and the first notification unit and the second notification unit make the notification near the operation unit.

11. The article supply device according to claim 1, wherein the main body includes an operation unit, which performs an operation for making the one of the articles to be suppliable from the supply unit, and the operation unit is operable when the lock unit is in a lock release state.

12. The article supply device according to claim 1, wherein in a state where no article is accommodated in the accommodation unit, the first member and the second member of the detection unit get closer to each other than those in a state where the articles are accommodated in the accommodation unit.

13. The article supply device according to claim 1, wherein the second member is a magnet, and the detection unit detects the absence of the articles, based on a magnetic force generated when the first member get close to the second member.

14. The article supply device according to claim 1, wherein the accommodation unit is configured so as to be detachable from the main body, and the first member is provided below the accommodation unit attached to the main body, and at a position where the second member can get close the first member.

* * * * *